(12) United States Patent
Lanning et al.

(10) Patent No.: US 6,314,978 B1
(45) Date of Patent: Nov. 13, 2001

(54) RECIPROCATING FEED SYSTEM FOR FLUIDS

(75) Inventors: Mark Eric Lanning, Littleton, CO (US); James B. Blackmon, Jr., Brownsboro, AL (US)

(73) Assignee: McDonnell Douglas Corporation, Huntington Beach, CA (US)

(*) Notice: Subject to any disclaimer, the term of this patent is extended or adjusted under 35 U.S.C. 154(b) by 688 days.

(21) Appl. No.: 08/604,376

(22) Filed: Feb. 21, 1996

(51) Int. Cl.[7] ........................................................ F17D 1/02
(52) U.S. Cl. ................................ 137/1; 137/256; 137/266
(58) Field of Search ..................................... 137/256, 255, 137/627, 266, 263; 244/135 C, 135 R (56) References Cited

U.S. PATENT DOCUMENTS

| | | |
|---|---|---|
| 1,963,514 | * 6/1934 | Astle ........................................ 137/256 |
| 2,372,448 | * 3/1945 | Porteous ............................. 137/256 X |
| 2,372,449 | * 3/1945 | Porteous et al. .................. 137/256 X |
| 4,609,169 | 9/1986 | Schweickert et al. . |
| 4,880,185 | 11/1989 | Apfel . |
| 4,932,609 | * 6/1990 | Secchiaroli et al. ............. 137/256 X |
| 5,116,000 | 5/1992 | Girard . |
| 5,251,852 | 10/1993 | Pulkowski et al. . |

* cited by examiner

Primary Examiner—Charles T. Jordan
Assistant Examiner—Lulit Semunegus
(74) Attorney, Agent, or Firm—The Bell Seltzer Intellectual Property Group of Alston & Bird L

(57) ABSTRACT

To produce a high pressure stream of fluid, such as propellant, the fluid is transfered from a low pressure reservoir into a plurality of intermediate storage tanks, in which the fluid is pressurized. The fluid is drained from the storage tanks to an outlet in sequence. While one pressurized storage tank in a three pressurized tank system is being drained, the most recently drained one of the storage tanks is being vented, and still another of the storage tanks is being filled or replenished with fluid, as the case may be, from the low pressure reservoir.

21 Claims, 5 Drawing Sheets

Fig_2

Fig_4

Fig_5

Fig_6

Fig_7

RECIPROCATING FEED SYSTEM FOR FLUIDS

FIELD OF THE INVENTION

The present invention relates to fluid transport systems and, more particularly, to a fuel delivery system for rocket propulsion apparatus.

BACKGROUND

Rocket propulsion systems at present employ either a pressure fed System, hereinafter referred to as a propellant tank pressurization system, or a turbopump system to transfer propellant to the combustion chamber. With the turbopump system a turbine driven pump is used to supply the propellants to the rocket's engine thrust chamber. This turbine is driven by either a gas generator or "expander cycle". The alternative propellant tank pressurization system pressurizes the main storage tanks. Under the force of that pressure, the storage tank discharges stored propellants into the engine thrust chamber.

Each of the foregoing fluid feed systems are capable of operating in a micro gravity or adverse acceleration environment, which is commonly found in upper stage rockets and space vehicle operations. Those feed systems, therefore, require sophisticated propellant acquisition devices unique to those environments. Although useful, those prior feed systems have a number of known disadvantages.

The disadvantage of a turbo pump system is its high cost, limited life, and, in certain situations, its reliability. Turbo pump systems are expensive to develop, procure and maintain. In addition, the extraction of hot combustion gases, the expansion gases necessary to drive the turbopump turbines, increases system complexity over the alternative propellant tank pressurization system and also reduces the turbines reliability.

Moreover, if a turbo pump is being used for a hybrid system, one that uses a solid fuel and a liquid oxidizer, several additional disadvantages are realized. First, no liquid or gaseous fuels are available to supply a gas generator driven turbine; only the oxidizer is available. The combustion gases in the main thrust chamber exceed the maximum operating temperature of existing turbine materials. That temperature effectively eliminates those gases as a turbine drive fluid, unless a complex method of moderating such high combustion temperatures is later developed. Further, a reliable, simple and effective method to start this type of system, ie. "boot strapping", is unavailable.

If instead, a gas generator cycle is selected, then additional fuel, such as RP-1, liquid hydrogen ($H_2$) and the like, must be stored on board the vehicle to generate the desired combustion gas conditions for driving the turbo pump turbine. So doing increases the cost and complexity of the fuel delivery system.

A regeneratively cooled nozzle could also be used to drive a turbo pump turbine. However, since hybirds are selected based on the operational simplicity characteristic of conventional solid rocket motors, the addition of a regeneratively cooled nozzle necessarily lessens the attractiveness of the hybird system. Further, if, despite the greater weight and complexity, a regeneratively cooled nozzle is selected nonetheless to drive the turbine, the expansion gases must be transferred from the nozzle section to the turbo pump turbine, which is located above the combustion chamber, then returned and discharged to either the combustion chamber, nozzle or overboard vent. Those requirements further increase cost and complexity.

Turbo pumps are not available for work in applications having extremely low flow rates, such as existing in presently proposed electric propulsion system designs.

Turbo pump systems face severe operational issues when used for long term applications involving high temperatures as result from $LH_2/LO_2$, or involving corrosive fluids, such as nitrogen tetraoxide or nitric acid; in particular, turbo pump systems must be essentially completely disassembled and refurbished for each flight with reusable launch vehicles, such as the shuttle orbiter.

The prior propellant tank pressurization system has singular drawbacks. Although simple in structure, propellant tank pressurization systems impose a significant weight penalty associated with pressurizing the main propellant tanks. In order to confine the high pressure levels, the tank must be strong. That strength is equated with greater thickness of the pressure vessel material, such as steel, aluminum and the like metals, and, accordingly great weight. As higher pressurization levels are specified, the weight of the tank increases. Not only is weight of the tank a penalty, but, as larger pressures are specified, a practical limit is reached to the tank size and weight for the rocket application. To minimize the tank weight, as a practical matter, the combustion pressures must be lowered in order to reduce tank supply pressures. This results in reduced performance, as compared to a typical turbo pump feed system. As a consequence, low thrust chamber pressures, and, hence, reduced performance, must necessarily be accepted in order to maintain an acceptable tank weight and corresponding booster mass ratio, the effective propellant mass divided by the initial vehicle mass.

To acquire propellants in a micro gravity or adverse acceleration environment, propellant acquistion devices are required. Those devices are designed to use the surface tension characteristics of the propellants to maintain a continuous, uninterrupted supply of propellant flow. Such acquisition devices for propellant tanks are necessarily large in size and are therefore much more susceptible to the hydrostatic and dynamic forces that result from adverse acceleration fields. Those forces can cause the propellant acquisition device to "breakdown" or, as variously termed, "breakthrough", resulting in an undesirable two-phase flow condition in which gas is ingested into the turbopump or engine, causing pump damage from cavitation and combustion problems. That situation is aggravated when large propellant tanks contain low quantities of propellant, as occurs when a major portion of the stored propellant is depleted. With the lesser volume of propellant, the surface area of the screen or channel in continuous contact with the suspended liquid, such as occurs during engine re-start, is reduced and thus the pressure drop of the liquid flowing through the screen is increased, and can lead to "breakdown", namely gas ingestion.

Other techniques for acquiring propellant for engine re-start operations require vehicle rotation or linear acceleration to settle the propellant and keep it at the bottom of the tank. Those approaches are also known to have adverse performance impact on space vehicle design in that they require additional propellant to accelerate the vehicle with small thrusters before the main engines can be started.

An object of the invention therefore is to provide a novel and versatile fuel delivery system.

An additional object of the invention is to provide a fuel delivery system for rockets that avoids the disadvantage of a turbo pump system or the weight penalty associated with main propellant tank pressurization in the propellant tank pressurization system.

A further object of the invention is to provide a fluid transport system that is of lesser weight and improved performance than the prior single tank pressure fed system.

A still further object of the present invention is to provide a fluid transport system that is of greater maintainability and reliability than a turbo pump system.

A still additional object of the invention is to reduce the problem of propellant acquisition in a micro gravity or adverse acceleration environment.

SUMMARY OF THE INVENTION

In accordance with the foregoing objects, the fluid transport system of the present invention transfers fluid, such as propellant, from a low pressure reservoir to an outlet at high pressure in a continuous stream by transferring fluid from the low pressure reservoir into a plurality of intermediate storage tanks in which the fluid is pressurized. The fluid is drained from the storage tanks to the outlet in sequence. In a more specific aspect, the plurality of such tanks, preferably, is at least three and, preferably, no more than four in number. While one pressurized storage tank is being drained, the most recently drained one of the storage tanks is being vented, and still another of the storage tanks is being filled or replenished with fluid, as the case may be, from the low pressure reservoir. Each of the storage tanks is so drained, vented and re-filled in sequential out of phase order. With that structure a continuous high pressure stream of fluid is achieved at the outlet.

Advantageously, since the storage tanks are continuously drained and refilled, the storage tanks may be relatively small in size. The fluid reservoir, also a tank, is relatively large in size, but may be of a less substantial construction than the smaller storage tanks, since the reservoir is not required to withstand high pressures. And notwithstanding the additional elements included in the novel fluid transport system to accomplish such sequencing, a substantial weight savings is realized over a single tank transport system.

In accordance with an additional aspect of the invention, sequencing is controlled by an electrical controller, suitably including a programmed digital processor or computer. The controller sequences operation of a series of inlet valves, outlet valves, pressurization valves and vent valves associated with the storage tanks for the sequencing. Suitably, fluid level sensors and/or flow meters are included to provide the controller information necessary to advance draining operation from one storage tank to another in the sequence.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF THE PREFERRED EMBODIMENTS

Figures 1, 8:
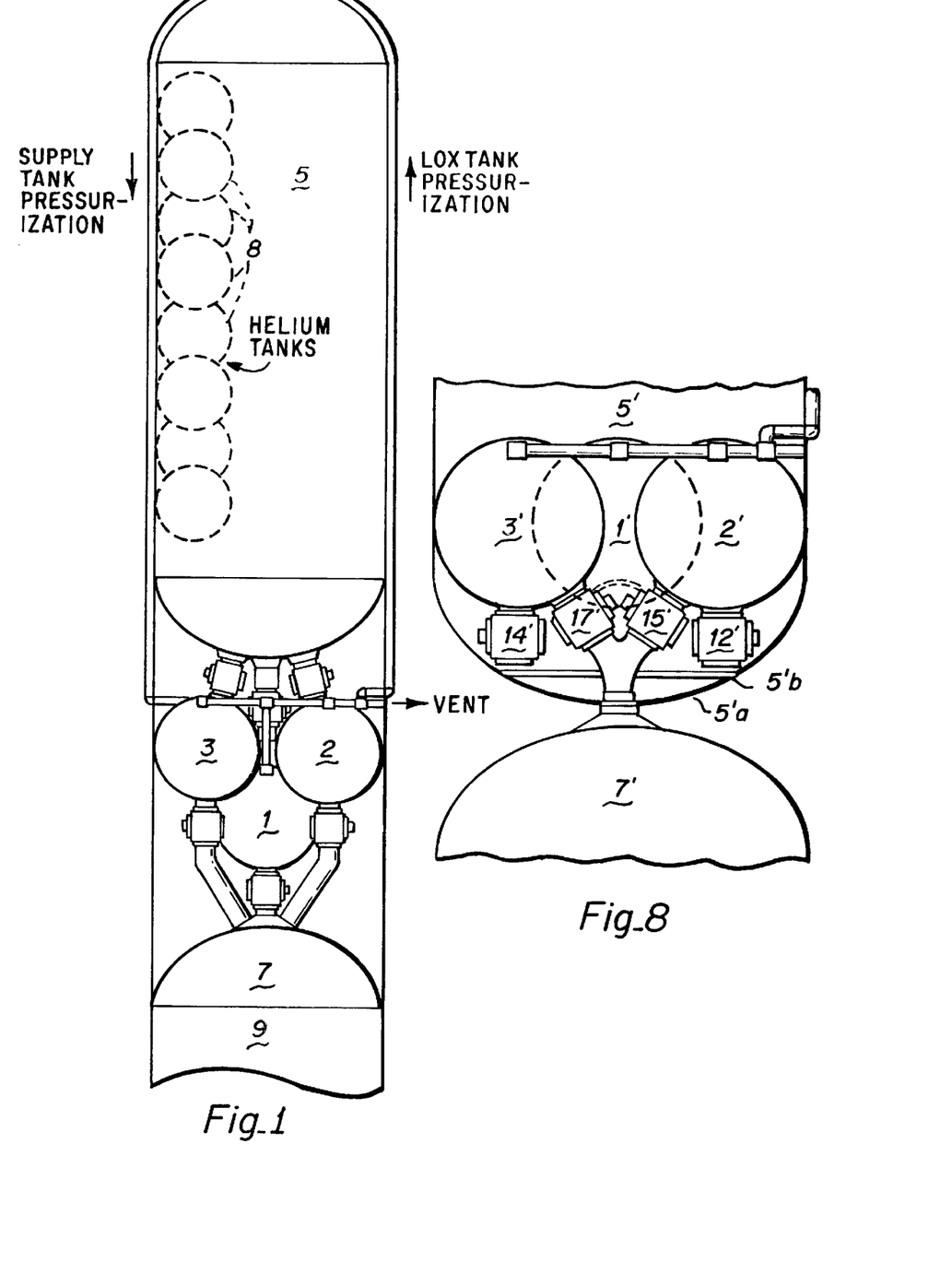
FIG. 1 is a partial pictorial view of a rocket engine that contains an embodiment of the novel reciprocating feed system.
FIG. 8 illustrates an alternative physical configuration for the storage tanks with the tanks reposed within the low pressure supply tank as may be used in the embodiment of FIG. 1.

As an introduction to the transport system, reference is first made to FIG. 1 which pictorially partially illustrates a liquid oxygen, LOX, supplied hybrid booster rocket containing the improved feed system. The figure illustrates the preferred mechanical relationship of the major components of the system as fitted within a rocket casing, partially illustrated, a preferred application of the invention. This includes a minimum of three small sized high pressure supply or storage tanks 1, 2 and 3 which are nestled between a liquid oxygen tank 5, the low pressure reservoir, and supply accumulator tank 7, the latter partially illustrated, that outputs into the rocket's solid fuel thrust chamber 9.

Each high pressure supply tank contains two outlets and each such outlet is controlled by a respective valve. One of those valves, referred to as an inlet valve, connects the outlet to the liquid oxygen tank 5. The other valve, referred to as a drain valve, connects to a feed line to supply accumulator tank 7. Additional tanks 8 containing pressurized Helium gas are conveniently stored in the same rocket compartment containing the low pressure liquid oxygen tank 5. Alternately, the Helium tanks can be located between the liquid oxygen tank 5 and the accumulator tank and solid fuel thrust chamber 7 and 9. The high pressure supply tanks, valves, and feed lines form major elements of the reciprocating feed system. In brief, each small storage tank is readily filled with fluid from the low pressure reservoir; and each of those tanks is sequentially drained so as to produce an essentially continuous high pressure fluid stream into accumulator 7. It is appreciated that the system is more complex than the foregoing introduction admits, as becomes apparent from the description which follows.

Figure 2:
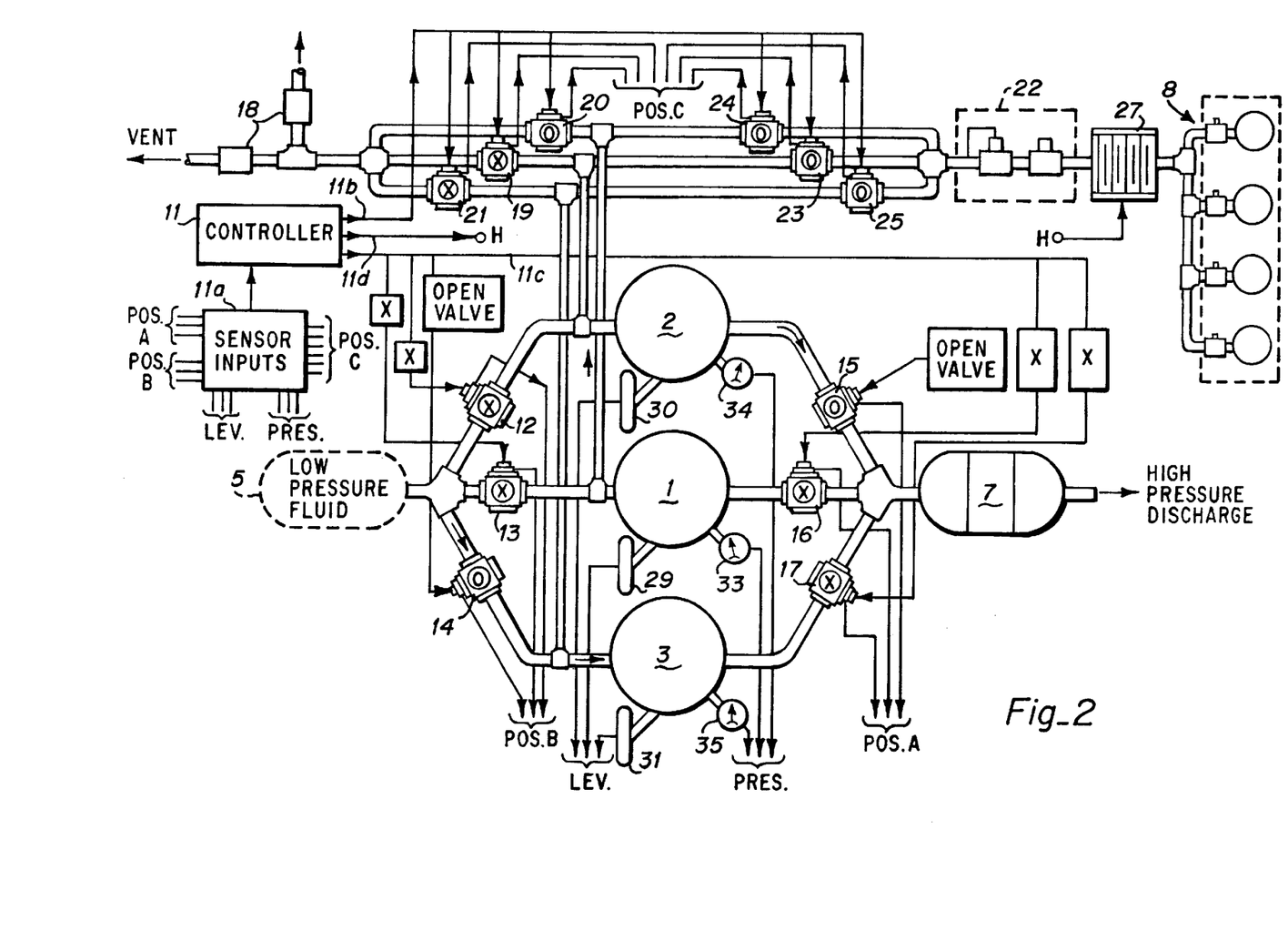
FIG. 2 is a block diagram of the control system for controlling sequencing of the various valves in the reciprocating feed system.

The feed system is presented schematically and in more complete detail in FIG. 2, to which reference is next made. In this figure the feed system is illustrated in block diagram and schematic form. A conduit extends from the low pressure fluid supply 5, and branches into three paths, each of which is controlled by respective inlet valves 12, 13, and 14, that couple into respective ones of the high pressure supply tanks 2, 1, and 3. Fluid conduits lead from the outputs of each such supply tank, controlled by a respective outlet or drain valve 15, 16 and 17, and converge into a main conduit that is coupled to the pressure surge tank or, as variously referred to, the supply accumulator 7. Thus inlet valve 12 controls the inlet to tank 2 and drain valve 15 controls that tank's outlet; inlet valve 13 controls the inlet to tank 1 and outlet valve 16 controls that tank's outlet; and valve 14 controls the inlet to tank 3 and outlet valve 17 controls that tank's outlet. The inlet and outlet valves provide control of fluid into and out of the respective tanks in the order and sequence specified by a controller 11.

The system includes vent valves 19, 20, and 21 and gas pressure valves 23, 24 and 25, one associated with each of the storage tanks 1, 2 and 3. A portion of the inlet conduit lies between the output end of the inlet valve, such as valve 12, and the storage tank's inlet. A conduit is connected to that portion and extends into the conduit illustrated at the upper portion of the figure, placing that conduit in communication with another conduit that extends in two directions. To the left, the conduit connects to an associated vent valve, and from that vent valve, converges with the output end of the remaining vent valves, to a vent manifold 18. To the right, the conduit extends to the outlet end of an associated gas pressure valve, such as valve 23. From that gas pressure valve the conduit extends further to the pressurized helium gas supply, indicated by the dash lines 8, in common with the other gas pressure valves via a pressure cut off and regulator 22, a known device provided for protection, and a gas heater 27, an optional device that is used to raise the temperature of the inert gas. Conveniently the source of inert pressurized gas is provided by a number of small storage bottles, as illustrated, coupled through valves in common to a single outlet.

The gas pressure and vent valves provide control of gas pressurization and venting of the respective tanks in the sequence specified by controller 11. One of the valves in a branch, valve 24 as example, allows pressurization gas into the associated storage tank, tank 1 as example, only during an interval when the associated vent valve in the branch, such as valve 20 in the example, remains closed. Conversly, the vent valve 20 allows gases to vent from tank 1, only during an interval when the pressure valve 24 in that branch is closed.

Each of the foregoing inlet, drain, vent and gas pressure valves includes an associated electrical actuator and/or pneumatic actuator for opening and closing the respective valve in response to electrical control signals. This is a common feature intended to allow electrical control of the valve's operational state. The electrical actuator is represented in the figure by the arrow on the electrical lead that points inwardly to the top portion of the valve.

Each of the foregoing valves also contains a position sensor. This is represented in the figure by the arrow on the electrical lead pointing outwardly from the valve position beneath the valve's actuator. The position sensor provides an electrical signal indicative of the operational state of the valve, providing information as to whether the valve is open or closed or the intermediate position to which the valve is open. This permits electrical "feedback" to ancillary equipment, in this case controller 11, that the valve has actually responded to the electrical command signal applied to the respective valve's actuator. Valves with such control actuator and position monitor combinations are well known.

Controller 11 provides the overall electrical control of the system. It monitors the various sensors via its sensor input interface 11a and controls proper sequencing of the valves during operation via its various outputs, represented by command lines 11b, 11c and 11d, hereafter discussed in greater detail. The controller is formed of a programmed general purpose computer or a dedicated special purpose digital computer, an output electronic module, and a data bus coupling. Controllers of the foregoing type are entirely conventional in the industry. As becomes apparent from the description of operation which follows, the computer's program is rudimentary in nature and performs simple sequencing tasks.

Instrumentation associated with each storage tank provides liquid level information and pressure information for controller 11. Thus each tank contains a sensor for sensing liquid level, suitably a conventional capacitance probe or point liquid level sensor, or such other devices as can be used for this purpose, ie., acoustic devices, and/or a flow meter that is able to integrate the inlet and outlet flow to determine liquid level and a pressure sensor to provide information on the respective tank. Thus level sensor 29 monitors fluid level in storage tank 1 and provides an output signal representative of that level; level sensor 30 performs the same function for storage tank 2; and level sensor 31 provides information on fluid levels in storage tank 3. The level sensors are coupled via leads LEV to the sensor input interface 11a for controller 11. A thermocouple is coupled to the storage tanks to provide information on the pressurant temperature. Thus, pressure sensor 33 provides information on pressure in tank 1; pressure sensor 34 provides that information for storage tank 2; and pressure sensor 35 provides pressure information on storage tank 3. These sensors are also coupled via leads PRES to sensor interface 11a. The foregoing sensors are entirely conventional in structure and readily available on the market.

As illustrated, the leads from the various valve position sensors are coupled to the sensor input interface 11a of controller 11 via the various cables labeled POS A, POS B and POS C. The controller's outputs are illustrated as command lines 11b and 11c extending to each of the pressure and vent valves and to each of the inlet and drain valve actuators wherein each such valve is individually controlled by the controller. To aid in understanding of the operation, the commands to the actuators in one step in the sequence of operation are illustrated graphically in the figure, with those valves commanded to be open represented either by a box containing an "open"or a "O" and those commanded to be closed by an "X" within a box and/or within a valve.

Prior to system operation, the three high pressure tanks are initially filled with propellant and are pressurized. Not all such tanks need be initially filled with propellant, but it is more efficient to do so, since the low pressure main tank volume can be decreased and, thus, weight can be minimized.

The pressurization gases 8 used to pressurize the tanks both prior to operation and during operation, may be selected from among four sources: high pressure bottles stored at ambient conditions, high pressure bottles stored cryogenically using a heat exchanger to condition the propellants, either regenerative cooling or a small gas generator supplied heat exchanger, or autogeneous pressurization incorporating a small high pressure compressor, the latter being electrically driven or driven by a small gas generator, autogeneous pressurization gases generated at other locations on the vehicle. When a choice of pressurization source is made, the option selected is then preferably evaluated to determine the optimum pressurization cycle for a specific vehicle configuration in accordance with good engineering practice.

In those embodiments requiring installation of gas heater 27, controller 11 provides a command output lid that actuates the heater as necessary at the appropriate interval. It should be noted that heater operation is not necessary to understanding of the invention and is not further discussed.

The reciprocating feed cycle begins with the high pressure propellant flow discharging from tank 1 to the supply accumulator 7 and/or the thrust chamber. Once tank 1 is depleted, tank 2 begins expelling propellant into the thrust chamber, while tank 1 vents overboard. While tank 1 is venting, a small percentage of the gases from tank 1 are bled to the main storage tank to expel propellants to fill tank 3, which for purposes of this description is assumed to be empty initially. Tank 3 is then presurized and begins transferring propellant to the thrust chamber once tank 2 is depleted. This feed, vent, re-fill, pressurize, and feed cycle continues, alternating between the three tanks, until the booster propellants have been deleted. It is noted that the amount of gas that is bled into the main tank from tank 1 is equivalent to the volume of liquid being expelled into tank 3, at the ullage pressure of the main tank. The remainder is vented overboard during the tank 1 vent and refill cycle. That sequence is typical.

The schematic of FIG. 2 also illustrates one step in the reciprocating feed system. Those valves that are set in the open state are indicated as open or by an "O" and those valves that are closed are represented by an "X" in the valve. As shown outlet valve 15 is open and fluid in pressurized tank 2 flows from the tank into the supply accumulator 7 and from the accumulator discharges to the rocket's thrust chamber, not illustrated. Both the vent valve 19 and the pressure valve 23 associated with tank 2 are closed; and the inlet valve 12 to tank 2 is closed. Meanwhile, the inlet valve 14 to tank 3 is open and fluid from low pressure reservoir 5 is feeding into tank 3, while the associated drain valve 17 is closed.

It is noted that, for a vehicle launched from earth, as liquid enters tank 3, any unvented gas that remains is forced out against atmospheric pressure, whereas for launches under space vacuum conditions, all gas would be vented prior to the refill operation for that tank.

Gas pressure valve 25 associated with tank 3 is opened when tank 3 is full, while the associated vent valve 21 is closed, allowing pressurant gas to feed into and pressurize the fluid introduced into tank 3. As to the remaining tank, 1, at this time in the sequencing, which is illustrated as empty, both the inlet valve 13 and drain valve 16, associated with that tank, are closed. The associated pressure valve 24 is closed and its associated vent valve 20 is open, allowing tank 1 to be vented to the vent manifold.

FIGS. 3A–3D schematically illustrate the feed cycle operation sequence. Again in these figures those valves that are set in the open state are indicated as open or by an "O" and those valves that are closed are represented by an "X" in the valve.

Figure 3A:
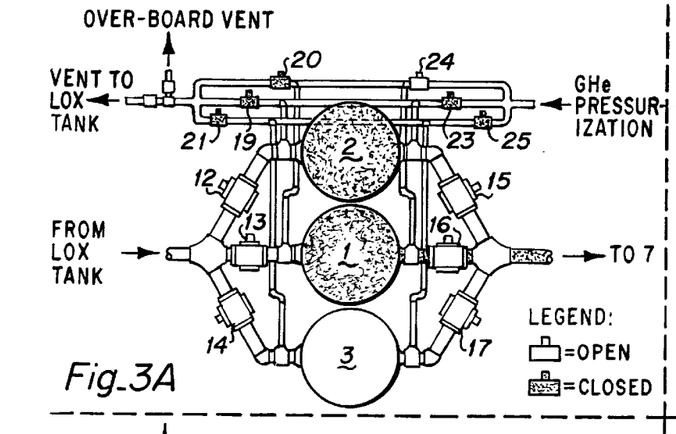
FIGS. 3A, 3B, 3C and 3D are schematics illustrating the cycle operational sequence.
Figure 3B:
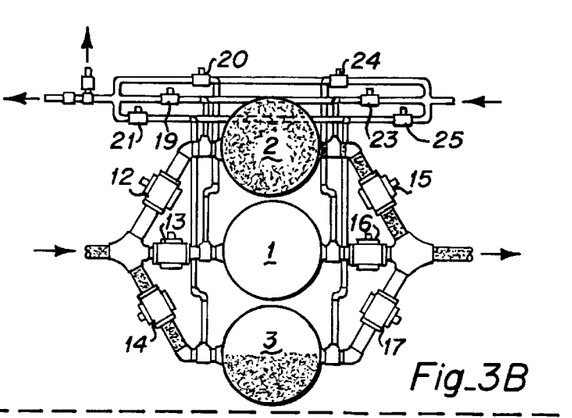

As shown in FIG. 3A at the start, tank 1 and 2 are initially full and tank 3 is empty. Drain valve 16 is opened to start draining tank 1 to the pressure surge tank 7 and the engine's injector. In the second cycle shown in FIG. 3B, tank 1 is depleted and drain valve 16 closed and that tank vents through vent valve 20, which opens. Drain valve 15 opens and tank 2 starts draining to the pressure surge tank and the engine's injector; and tank 3 is being filled and pressurized.

Figure 3C:
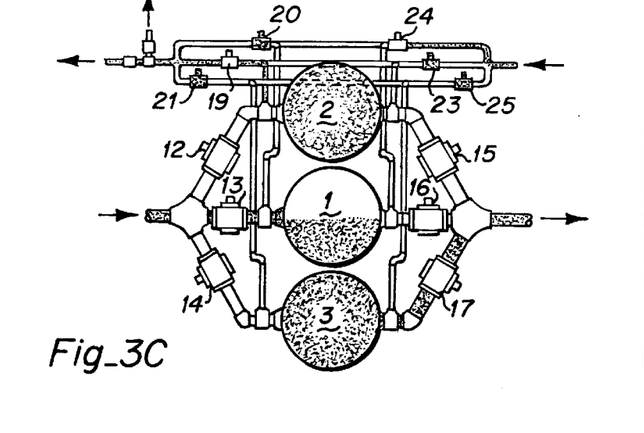
Figure 3D:
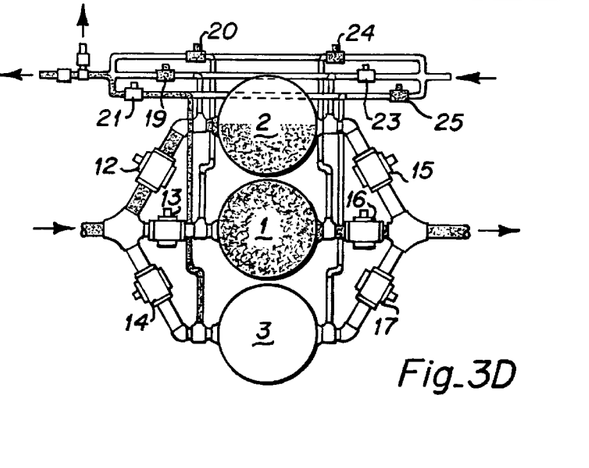

In the next cycle illustrated in FIG. 3C, tank 3 starts draining fuel to the injector; tank 2 is depleted and vents through valve 19, now open; and tank 3 is being filled and pressurized. Cycle 1 then repeats as in FIG. 3D, wherein tank 1 starts draining fuel to the the pressure surge tank and the engine's injector; tank 3 is depleted and is being vented; and tank 2 is being filled and pressurized. The cycle then repeats.

The foregoing sequence is summarized in the following matrix in which each of the three cycles illustrated in FIG. 3 is represented by a start time (1st) and an end time (2nd) to a cycle for a total cycle time of six seconds:

| Cycle Time (seconds) | Tank 1 | Tank 2 | Tank 3 |
|---|---|---|---|
| 1st | Start of No. 1 flow to engine. | Fill | Vent (begin & end) |
| 2nd | 2nd sec. of No. 1 flow to engine and cutoff. | Fill (end) | Fill (begin) |
| 3rd | Vent (begin & end) | Start of 1st sec. of No. 2 flow to engine | Fill |
| 4th | Fill (begin) | 2nd Sec. of No. 2 flow to engine & cutoff. | Fill (end) |
| 5th | Fill | Vent (begin & end) | Start of 1st sec. of No. 3 flow to engine. |
| 6th | Fill (end) | Fill (begin) | 2nd sec. of No. 3 flow to engine and cutoff. |

FIGS. 4, 5, 6 and 7 represent typical flow rates and time lines for a 108 klbf thrust hybrid using a 57 foot long tank of 3.6 feet diameter. The flow overlap time intervals are estimates.

Figure 4:
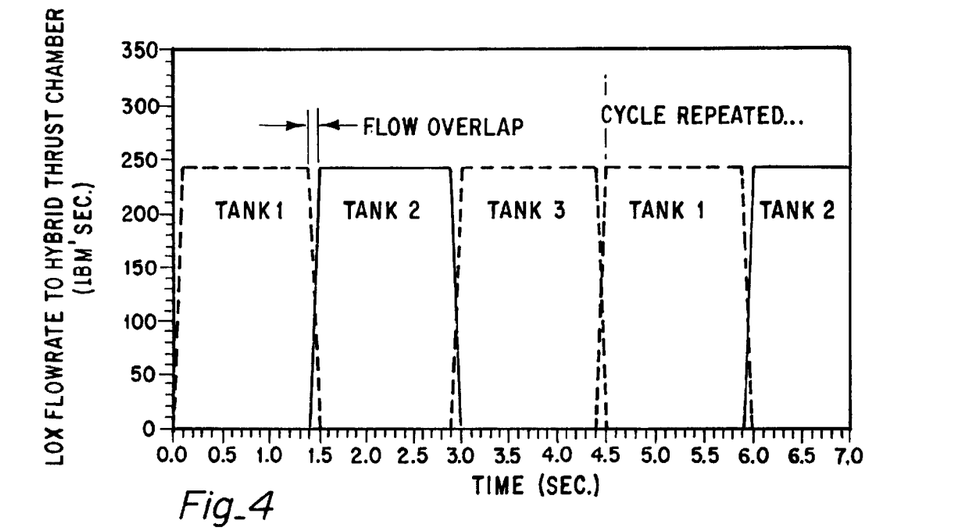
FIG. 4 graphically illustrates typical flow rates and time lines for a 180 klbf thrust hybrid in the small storage tank liquid oxygen feed cycle.

FIG. 4 illustrates the flow rate to the thrust chamber and injectors over a period of time and indicates which of the tanks is contributing propellant at any instant of time. As is noted in the figure there is a slight overlap when transfering from one propellant tank to the next. This overlap is desirable to maintain continuous flow to the thrust chamber.

Figure 5:
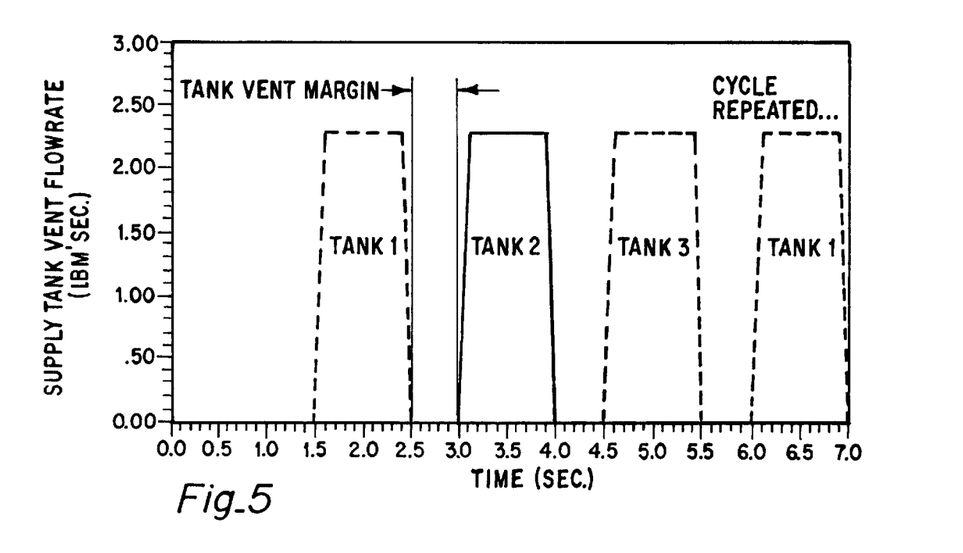
FIG. 5 illustrates rates and time for the storage tank vent cycle.
Figure 6:
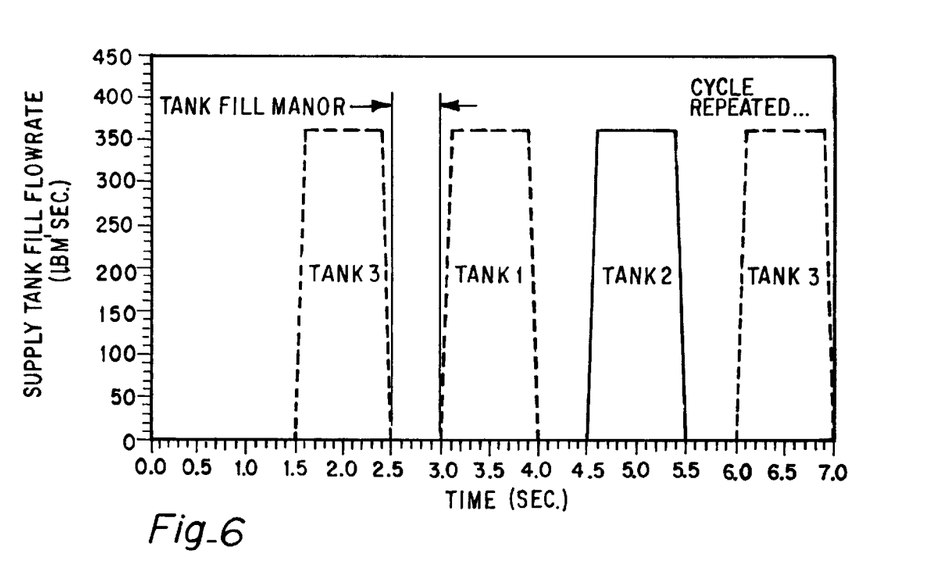
FIG. 6 graphically illustrates flow rates and times for the storage tank liquid oxygen fill cycle.
Figure 7:
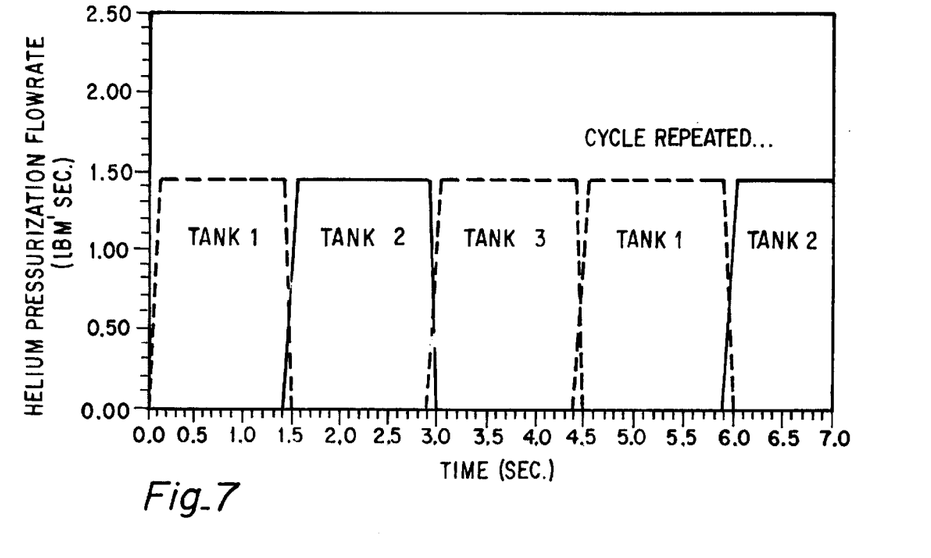
FIG. 7 illustrates the storage tank pressurization cycle.

FIG. 5 graphically illustrates the supply tank vent flow rate as it varies over a period of time for each of the three propellant tanks. FIG. 6 graphically illustrates the supply tank fill flow rate over a period of time. It is noted that a margin of time is provided between the time one tank is filled to commencing fill of the next tank. During that margin of time the next propellant tank is being pressurized prior to commencement of propellant fuel flow into that tank. FIG. 7 graphically illustrates the Helium pressurization flow rate over time and the tank that is being pressurized at any instant of time.

The control of the reciprocating propellant feed system is more complex than that of conventional liquid propellant rockets. The major control processes performed by the disclosed system include: Start rocket operation; shut down rocket operation; restart rocket operation; make emergency shutdown; maintain programmed operation; fill, empty and vent the propellant storage tanks; and fill and vent gas generator and pressure spheres.

The starting process was earlier described. Briefly, the starting process consists of ground pressurization of the propellant tanks, all of which are initially filled with propellant, and ground pressurization of the gas generator and pressurization gas sphere. The main propellant valves for the storage tank 1 are then opened, propellant flows under pressure into the combustion chamber, and ignition occurs. At the same time, propellant from the main propellant lines is injected into the gas generator and ignited. The resultant high pressure gas replenishes the supply and the cycle then becomes self-sustaining.

Alternately, cold gas, such as Helium stored within the LH2 and/or LO2 tanks, or ambient gas, can be heated by flowing through a heat exchanger heated by the combustion gases of the engine or by a gas generator, such that the pressurization gas required is reduced by increasing its temperature to attain the required operating pressure.

Shut down procedures for the system are either a shut down with the prospect of restarting or a final shutdown. The shut down with restart requires that at least one storage tank system must contain sufficient propellant for restarting. From the description of operation earlier presented, it is apparent that at any instant of time, at least one of the storage tanks is full of propellant. As recalled from the earlier description, having a propellant filled bottle satisfies the conditions required for start up of the system. Thus the engine can be shut down at any time and later restarted. As later herein described, the foregoing offers advangages in terms of engine restart after a so-called coast under micro-gravity conditions.

The pressure sphere and gas generator must contain sufficient pressurant to pressurize and transfer enough propellant to achieve stable operation; this requirement is also met at any instant of time since it is one of the necessary conditions governing the pressure sphere volume.

Final shut down can occur at any time, either by a rapid engine shut off or by tapering off the engine thrust level. When the main propellant valves are closed, should a gas generator be used in the embodiment, then the gas generator valves are also closed. The gas generator, pressure sphere or pressurant bottles and the propellant tanks are then vented, which is typical.

The restart process is the same as the start process, except that for certain designs the bottle pressurizing gas is supplied by the gas generator and pressure sphere.

Emergency shut down is no different from the normal shut down procedure, except that emergency shut down is initiated by instruments that sense a malfunction. As example, controller 11 detects that a position sensor has not confirmed execution of an open or a close command to an inlet or drain valve; that a pressure sensor fails to indicate proper pressurization within a predetermined interval; that a level sensor fails to indicate depletion of a tank being drained within a predetermined interval; and so on. If a fourth bottle is used in the system, a system failure results in bypassing the failed tank and using instead the fourth pressure bottle.

In an alternate embodiment, four storage tanks may be used instead of the three storage tanks as described. With four storage tanks, the sequencing is slightly modified.

| cycle | tank 1 | tank 2 | tank 3 | tank 4 |
|---|---|---|---|---|
| 1st | Flow (begin) | Fill (end) | Fill | Vent (begin & end) |
| 2nd | Flow (end) | Wait | Fill | Fill (begin) |
| 3rd | Vent (beg. & end) | Flow (begin) | Fill (end) | Fill |
| 4th | Fill (begin) | Flow (end) | Wait | Fill |
| 5th | Fill | Vent (beg. & end) | Flow (beg.) | Fill (end) |
| 6th | Fill | Fill (begin) | Flow (end) | Wait |
| 7th | Fill (end) | Fill | Vent (beg & end) | Flow (begin) |
| 8th | Wait | Fill | Fill (begin) | Flow (end). |

With the fourth tank, it is seen that at some points in the sequencing two of the four tanks are being replenished with fluid from the low pressure reservoir simultaneously for a portion of an interval; there is some overlap in the filling operation. Additionally during a portion of the sequencing each tank includes a "wait" state following the filling step prior to draining the tank into the supply accumulator. The addition of a fourth tank, although adding additional weight in the system, permits continuous operation even with the failure of valves associated with either of the other three tanks, thus providing so-called "fail operational" capability with greatly increased system reliability, at only a slight increase in weight. Notwithstanding, the three tank system is preferred for most space borne applications, since it is more desirable in those systems for weight to be maintained at a minimum.

For operation in a micro gravity environment, the high pressure tanks permit the use of small and lighter propellant acquisition devices, such as surface tension screens and channels. Smaller devices increase the fluid retention capability over the larger sized acquisition devices normally installed in the main propellant tanks. Therefore for orbital re-start operations, the high pressure tanks would supply the initial thrust to settle the propellants in the main tanks, elimininating continuous, low level thrusters or settling rockets to maintain the propellants in a "settled" condition.

For electric propulsion systems, such as arc jet thrusters, the fluid flow rates are extremely low, but require moderately high supply pressures to maintain adequate performance. Currently there are no pumps or compressors compatible with such operating conditions, especially in the area of cryogenic fluids. The present feed system provides a viable operation for such applications and, in addition is more generally applied to hybrid boosters, liquid boosters, core vehicle 1st stage, advanced upper stages, including solar electric orbital transfer vehicles, and fluid transfer applications.

In an alternative packaging arrangement, the high pressure tank can be located within the main low pressure tank to minimize the total length of the vehicle. As example such an arrangement is partially illustrated in FIG. 8, in which the elements illustrated are designated by the same designation used for same in the prior embodiment with an additional prime symbol. The high pressure supply tanks 1', 2' and 3' are cloistered within the interior of the low pressure reservoir, main supply tank 5' as are the various valves, including submerged drain valves 15', 17' and the other drain valves, not illustrated, which are connected to feed lines to the solid fuel thrust chambe 7', submerged fill valves, 12', 14' the other fill valves, not illustrated, and the pressurization and vent lines shown on the upper end connected to the pressure supply tanks.

In this alternative, submerged fill valves, 12', 14' and the other fill valves, not illustrated, are used to allow liquid from the main tank 5' to pass directly into the high pressure tanks 1', 2' and 3'. Such arrangement reduces the overall vehicle length, but requires the main tank to include an access cover 5'a, either in the top or bottom end, large enough to allow insertion of the storage tanks and for a worker to access such storage tanks and valves for final assembly and a clamping latch 5'b to hold cover 5'a in place. Consequently, that configuration is particularly suited for large booster vehicles.

A still further alternative requires only two high pressure tanks, in which case only two of the three tanks 1, 2, and 3 are needed, or, if supplied, need be used. In appropriate applications, the time to vent and refill a high pressure tank, such as tank 1, may be less than or equal to the time taken to expel the liquid from another of the tanks at high pressure, say tank 2, then only two high pressure tanks need be used. In such situation the corresponding changes are made to the described control cycle and sequencing through re-programming of the controller, such as controller 11 in FIG. 1. Thus the valves will be operated in such a manner to allow tank 1 to drain, while tank 2 is vented and then is refilled. In the next step the valves are operated to allow tank 2 to drain and tank 1 is vented and then is refilled. The particular valve sequence is self evident from the earlier description.

Another application is in solar applications, particularly in a molten salt solar receiver. Therein heat transfer fluid, e.g., a molten nitrate salt, requires the pump to operate in a hot, typically 1050 degrees F, and corrosive environment. With the present feed system, the molten salt pumps are eliminated, thereby improving system reliability and lowering maintenance and cost. In this instance, the pressurant gas could be supplied by a compressor, driven by electrical power.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A fluid transport system for transferring fluid from a low pressure reservoir to an outlet at high pressure in a continuous stream, comprising:

a plurality of storage tanks, each of said storage tanks being capable of confining fluid at high pressure;

draining means for draining fluid from each of said plurality of storage tanks in sequential order to said outlet, said draining means draining each of said plurality of tanks in sequence such that a continuous stream of fluid is supplied to said outlet at high pressure; and filling means for supplying fluid from said low pressure reservoir to each of said drained storage tanks in sequential order to fill said respective tanks with said fluid;

said sequential order of each of said draining means and said filling means being out of phase with each other such that as one storage tank in said plurality is being drained by said draining means, at least another of said storage tanks is being filled by said filling means.

2. The fluid transport system defined in claim 1, wherein said plurality of storage tanks, comprises at least three and no more than four in number.

3. The fluid transport system defined in claim 1 further comprising:

venting means for venting each of said storage tanks in sequential order for releasing pressure in said storage tanks subsequent to draining thereof by said draining means and prior to filling thereof by said filling means;

said sequential order of each of said draining means, said filling means and said venting means being out of phase with each other, wherein while one tank in said plurality is being drained, another of said storage tanks is vented, and at least still another one of said storage tanks is being filled.

4. A fluid transport system for transferring fluid from a low pressure reservoir to an outlet at high pressure in a continuous stream, comprising:

a plurality of storage tanks, each of said storage tanks being capable of confining fluid at high pressure;

draining means for draining fluid from each of said plurality of storage tanks in sequential order to said outlet, said draining means draining each of said plurality of tanks in sequence such that a continuous stream of fluid is supplied to said outlet at high pressure; and filling means for supplying fluid from said low pressure reservoir to each of said drained storage tanks in sequential order to fill said respective tanks with said fluid; and venting means for venting each of said storage tanks in sequential order for releasing pressure and any fluid retained in respective ones of said storage tanks subsequent to draining thereof by said draining means and prior to filling thereof by said filling means;

said sequential order of each of said draining means, said filling means and said venting means being out of phase with each other such that while one tank in said plurality is being drained, another of said storage tanks is vented, and at least still another one of said storage tanks is being filled.

5. The fluid transport system defined in claim 4, wherein said plurality of storage tanks, comprises at least two and no more than four in number.

6. The fluid transport system as defined in claim 4, further comprising:

high pressure gas reservoir means for providing a source of gas at high pressure to said draining means, said gas being chemically non-reactive with respect to said fluid.

7. The fluid transport system as defined in claim 6, further comprising:

vent means for venting gas.

8. The fluid transport system as defined in claim 7, further comprising:

electrical controller means for controlling each of said draining means, said venting means and said filling means.

9. The fluid transport system as defined in claim 8, further comprising:

a plurality of fluid level sensor means, each of said fluid level sensor means being associated with a respective one of said storage tanks for providing fluid level information on the quantity of fluid in said respective storage tanks; said fluid level sensor means being coupled to said electrical controller means for providing information to said controller means of the fluid level in said storage tanks; and said controller means being responsive to an indication from said fluid level sensor means associated with a respective one of said storage tanks being drained by said draining means that said tank is drained of fluid for initiating the next sequence of each of said draining means, venting means and filling means.

10. The fluid transport system as defined in claim 9, wherein said draining means further comprises:

a plurality of outlet valve means, each of said outlet valve means being associated with a respective one of said storage tanks, each of said outlet valve means having a normally closed state and being operable to an open state to permit passage of fluid from the associated storage tank to said outlet;

and wherein the fluid transport system further comprises:

a plurality of pressurization valve means, each of said pressurization valve means being associated with one of said storage tanks, each said pressurization valve means having a normally closed state and being operable to an open state for applying pressurized gas from said high pressure gas reservoir into the associated storage tank to create a high pressure gas atmosphere within and pressurize any fluid within said associated storage tank;

and wherein said filling means, further comprises:

a plurality of inlet valve means, each of said inlet valve means being associated with a respective one of said storage tanks, each of said inlet valve means having a normally closed state and being operable to an open state to permit passage of fluid from said reservoir into the associated storage tank;

and wherein said venting means further comprises:

a plurality of vent valve means, each of said vent valve means being associated with a respective one of said storage tanks, said vent valve means having a normally closed state and being operable to an open state to permit gas from said respective storage tank to vent to said vent means;

a plurality of electrical actuator means, each of said electrical actuator means being associated with a respective one of said drain valve means, pressurization valve means, inlet valve means and vent valve means, each of said actuator means for positioning an associated valve means into a selected one of said open and closed states;

and wherein said controller means includes means for individually selectively controlling operation of each of said plurality of electrical actuator means to selectively place a drain valve means and pressurization valve means associated with one of said storage tanks in an open state, a vent valve means associated with another one of said storage tanks in an open state, and a fill valve means associated with still another of said storage tanks in an open state, simultaneously, while simultaneously permitting the remaining ones of said drain valve means and pressurization valve means to remain in a closed state.

11. The fluid transport system as defined in claim 10, further comprising:

a plurality of valve position sensor means, each of said valve position sensor means being associated with a respective one of said valve means for providing information on the position of the associated valve as being in either an open or closed state; and means coupling said plurality of valve position sensor means to said electrical controller means for providing valve state information to said controller means.

12. The fluid transport system as defined in claim 11, further comprising:

a plurality of pressure sensor means, each of said pressure sensor means being associated with a respective one of said storage tanks for providing pressure information on the pressure within said respective storage tank; and means coupling said plurality of pressure sensor means to said electrical controller means for providing storage tank pressure information to said controller means.

13. The fluid transport system defined in claim 12, wherein said plurality of storage tanks, comprises at least two and no more than four in number.

14. The fluid transport system as defined in claim 12, wherein said plurality of storage tanks comprises the number three.

15. The fluid transport system as defined in claim 12, wherein said plurality of storage tanks comprises the number four.

16. The fluid transport system as defined in claim 12, wherein said plurality of storage tanks comprises the number two.

17. The fluid transport system as defined in claim 4, wherein said low pressure reservoir comprises a main storage tank; and wherein each of said plurality of storage tanks is positioned in the interior of said main storage tank.

18. The fluid transport system as defined in claim 4, wherein each of said storage tanks further includes a propellant acquisition device, said propellant acquisition device comprising fine mesh screens and channels for providing outflow.

19. A method for transferring fluid from a low pressure reservoir to an outlet at high pressure in a continuous stream, the method comprising the steps of:

confining fluid at high pressure in each of a plurality of storage tanks;

draining fluid from each of the plurality of storage tanks in sequential order to thereby supply a continuous stream of fluid at high pressure to the outlet; and supplying fluid from the low pressure reservoir to each of the drained storage tanks in sequential order to fill the respective tanks with the fluid;

wherein the sequential order in which the storage tanks are drained is out of phase with the sequential order in which the storage tanks are filled such that as one storage tank is being drained, at least another of the storage tanks is being filled.

20. A method according to claim 19 further comprising a step of venting each of the storage tanks in sequential order following said draining step and prior to said supplying step to release pressure in the storage tanks.

21. A method according to claim 19 further comprising a step of sensing fluid level information related to a quantity of fluid in the respective storage tanks during said draining step.

* * * * *

UNITED STATES PATENT AND TRADEMARK OFFICE
CERTIFICATE OF CORRECTION

PATENT NO. : 6,314,978 B1
DATED : November 13, 2001
INVENTOR(S) : Lanning et al.

Page 1 of 1

It is certified that error appears in the above-identified patent and that said Letters Patent is hereby corrected as shown below:

<u>Title page,</u>
Item [56], References Cited, U.S. PATENT DOCUMENTS,
Line 1, "1,963,514" should read -- 1,963,519 --.

Signed and Sealed this

Ninth Day of April, 2002

Attest:

JAMES E. ROGAN
Attesting Officer Director of the United States Patent and Trademark Office